United States Patent [19]
Wiseman et al.

[11] Patent Number: 5,168,930
[45] Date of Patent: * Dec. 8, 1992

[54] DESICCANT FOR WELL ACIDIZING PROCESS

[75] Inventors: Ben W. Wiseman, 800 W. Wall St., Suite C, Midland, Tex. 79701; Leroy L. Carney, Houston, Tex.

[73] Assignee: Ben W. Wiseman, Midland, Tex.

[*] Notice: The portion of the term of this patent subsequent to Mar. 26, 2008 has been disclaimed.

[21] Appl. No.: 635,672

[22] Filed: Dec. 28, 1990

Related U.S. Application Data

[63] Continuation-in-part of Ser. No. 422,632, Oct. 17, 1989, Pat. No. 5,002,128.

[51] Int. Cl.$^5$ .................. E21B 43/27; E21B 41/02
[52] U.S. Cl. .................. 166/307; 166/312; 166/902; 252/8.551; 252/8.553
[58] Field of Search ............ 166/305.1, 271, 307, 166/311, 312, 902; 252/8.551, 8.552, 8.553

[56] References Cited

U.S. PATENT DOCUMENTS

| | | |
|---|---|---|
| 2,001,350 | 5/1935 | Mills . |
| 2,342,424 | 2/1944 | Newton et al. .............. 166/305.1 |
| 2,345,713 | 4/1944 | Moore et al. .............. 166/305.1 |
| 2,354,203 | 7/1944 | Garrison .................. 166/305.1 |
| 2,379,561 | 7/1945 | Bennett ................... 166/305.1 |
| 2,675,083 | 4/1954 | Bond et al. ............... 166/307 X |
| 2,850,098 | 9/1958 | Moll et al. ............... 166/307 |
| 3,072,185 | 1/1963 | Bond et al. . |
| 3,091,292 | 5/1963 | Kerr . |
| 3,100,528 | 8/1963 | Plummer et al. ........... 166/307 X |
| 3,252,512 | 5/1966 | Baker et al. . |
| 3,259,187 | 7/1966 | Prats et al. . |
| 3,344,858 | 10/1967 | Gilchrist et al. . |
| 3,353,597 | 11/1967 | Mulder . |
| 3,354,957 | 11/1967 | Every et al. .............. 166/307 X |
| 3,392,782 | 7/1968 | Ferrell et al. . |
| 3,398,791 | 8/1968 | Hurd ...................... 166/270 |
| 3,405,761 | 10/1968 | Parker . |
| 3,411,583 | 11/1968 | Holm et al. . |
| 3,507,747 | 4/1970 | Vogt, Jr. et al. .......... 166/307 |
| 3,532,165 | 10/1970 | Raifsnider ............... 166/270 |
| 3,722,594 | 3/1973 | Smith et al. ............. 166/307 X |
| 3,841,406 | 10/1974 | Burnett .................. 166/305.1 |
| 3,915,233 | 10/1975 | Slusser .................. 166/307 |
| 3,929,192 | 12/1975 | Friedman ................. 166/307 X |
| 3,938,593 | 2/1976 | Friedman ................. 166/307 |
| 4,250,965 | 2/1981 | Wiseman, Jr. ............. 166/307 X |
| 5,002,128 | 3/1991 | Wiseman, Jr. ............. 166/307 |

OTHER PUBLICATIONS

"The $CO_2$ Huff & Puff Process", Edmond L. Claridge, Dec. 6, 1984 *Enhanced Recovery Week Symposium.*
"Carbon Dioxide Injection into Bottom-Water, Undersaturated Viscous Oil Reservoir", *Journal of Petroleum Technology*, pp. 1248–1258 (Oct. 1977).
"$CO_2$-A New Shot in Arm for Acid Frac Jobs", *Oil & Gas Journal* pp. 92–97, Oct. 8, 1962.
"Carbon Dioxide-A Multipurpose Addition for Effective Well Stimulation", *Journal of Petroleum Technology*, pp. 237–242, Mar. 1963.

*Primary Examiner*—George A. Suchfield
*Attorney, Agent, or Firm*—Crutsinger & Booth

[57] ABSTRACT

A method of stimulating production from an oil or gas well comprising the steps of (a) injecting a desiccant through the well bore to dehydrate the well bore and a production zone within several feet around the well bore, (b) injecting an anhydrous acid into the production strata, the anhydrous acid being formulated to be gaseous at bottom hole temperature and pressure so that the gaseous anhydrous acid permeates through the dehydrated production strata and dissolves in connate water to form an acidic solution, and (c) shutting in the well for a period to allow the acidic solution formed in situ to react with the materials of the formation thereby increasing the permeability of the production strata and stimulating production from the well. A alcohol/polyglycol desiccant with exceptional lubricating, heat stability, and corrosion inhibiting characteristics is used to dehydrate the well and to form a corrosion resistant film on surfaces of the production string and casing.

26 Claims, 3 Drawing Sheets

DESICCANT FOR WELL ACIDIZING PROCESS

CROSS REFERENCE TO RELATED APPLICATIONS

This application is a continuation-in-part- of application Ser. No. 07/422,632 filed Oct. 17, 1989, entitled "WELL TREATING METHOD", now U.S. Pat. No. 5,002,128 which issued Mar. 26, 1991.

TECHNICAL FIELD

A well treating method wherein a production tubing string and a casing in an oil well and the surrounding production zone strata within several feet of the well bore are purged of water, dehydrated with a desiccant, and a monolayer protective film is formed on their surfaces prior to delivering anhydrous acids therethrough. The anhydrous acids react with connate water in the production strata around the well to increase the permeability of the strata and thereby stimulate production from the well.

BACKGROUND OF THE INVENTION

The method disclosed herein relates to improvements in the well treating method disclosed in U.S. Pat. No. 4,250,965 issued Feb. 17, 1981 to Ben W. Wiseman, Jr., the disclosure of which is incorporated herein by reference in its entirety. The Wiseman patent discloses a method of stimulating primary production of a well wherein liquid carbon dioxide is injected down the bore of the well at a pressure sufficient for gaseous carbon dioxide, formed by the evaporation of the liquid carbon dioxide, to permeate through the strata and react with connate water to make carbonic acid. The well is then shut in for a period of time enabling the carbonic acid to react with the rocks in the strata to increase the permeability of the strata and thereby stimulate production from the oil well.

Corrosive acids such as hydrofluoric, hydrochloric, nitric, acetic, and carbonic acids are often used for stimulating the production from an oil or gas well. Conventionally, these aqueous acids are pumped at high pressure into the well to react with rocks in the oil or gas bearing strata in an attempt to increase the permeability of the strata. When the corrosive acids are being pumped down the production tubing string or casing, they react to some degree with the materials used to make the tubing or casing even when an inhibitor is mixed with the acid.

In some cases the formation may be damaged when the liquid is pumped into the formation at high pressure. Clay particles tend to swell and become disassociated from rock in the formation which may reduce permeability. The creation of an oil/water emulsion and the entrapment of water by surface tension also reduce permeability.

Conventional acidizing processes generally require the use of substantial quantities of water and complicated equipment to flush and swab the well to minimize damage to the tubulars in the well. Recovery and disposal of the water to prevent ecological damage is expensive and time consuming. Further, water introduced and left in the formation may damage the reservoir.

A paper entitled "The $CO_2$ Huff 'N Puff Process" by Edmond L. Claridge presented at the Enhanced Recovery Week Symposium: EOR Using $CO_2$", Dec. 6, 1984, at Houston, Tex., contains a review of several publications which discuss the injection of $CO_2$ into an oil well alternating with production of the same well by a process referred to as "huff and puff." The article indicates that the cyclic $CO_2$ injection process lowered viscosity of the mixture of $CO_2$ and crude oil, swelled the crude oil in which $CO_2$ was dissolved, provided a solution-gas drive achieved by dissolving $CO_2$ in the crude oil up to a higher saturation pressure followed by lower pressures during production, and vaporization of components into $CO_2$ with recovery of light crude oil components from produced $CO_2$.

Liquid carbon dioxide and liquid hydrogen chloride have been used heretofore in an effort to increase the production of petroleum products from a well. U.S. Pat. No. 3,354,957 discloses a method for increasing the permeability of a subterranean formation comprising introducing substantially pure liquid anhydrous hydrogen chloride into the formation via a well bore to permit the hydrogen chloride to penetrate deeply into the formation and there form a strong effective acid with the irreducible water content of the formation. Before treatment, the well is pumped dry and filled with oil or another non-aqueous liquid. Liquid anhydrous chloride is then pumped down the tubing while the casing annulus valve at the well head is left open to permit discharge of the displaced oil at the surface. When a sufficient volume of the acid has been injected to displace the entire tubing string and the annular section opposite the pay zone, the annulus valve is closed and the pressure on the hydrogen chloride is then increased to force the hydrogen chloride into the formation where it vaporizes upon warming and upon contact with the connate water will ionize the yield hydrochloric acid which attacks and leaches the formation. Upon completion of the injection of the anhydrous hydrogen chloride into the formation, the disclosure states that the well is preferably shut-in and allowed to stand for from two hours to several days to permit the acid an opportunity to react. The residual hydrogen chloride, the hydrochloric acid which is formed and the gelatinous and insoluble salt materials are then removed from the formation and the well by flowing, swabbing or pumping, or during the course of ordinary production.

U.S. Pat. No. 3,411,583 discloses a petroleum recovery method in which a slug of fluid having a carbon dioxide content of at least 60 vol. %, desirably in a liquid state, a dense fluid or in gaseous form. Following injection of the fluid and subsequent injection of a sparingly oil-soluble gas such as nitrogen or air, the disclosure states that the well is preferably shut-in for a period of time to permit the carbon dioxide to become dissolved in the crude oil, and the sparingly oil-soluble gas to channel through and become distributed throughout the intended zone. The disclosure states that ordinarily a shut-in period of one to two days will suffice, and in general a period within this range is preferred, but a period of less than one day will suffice in some reservoirs while a period of more than three days will be required in others.

A paper entitled "CARBON DIOXIDE INJECTION INTO BOTTOM-WATER, UNDERSATURATED VISCOUS OIL RESERVOIRS", published in Journal of Petroleum Technology, pages 1248-1258 (October, 1977) describes an oil-recovery process that uses carbon dioxide in viscous, undersaturated oil reservoirs where the oil zone is underlain by bottom water. Seven mechanisms in a $CO_2$ displacement process which are believed to contribute to improved recovery of oil are stated to include: (1) oil-viscosity reduction, (2) oil swelling, (3) energy supplied to the reservoir, (4) vaporization of crude oil, (5) blow down recovery, (6) stimulation effects, and (7) interfacial-tension effects. A field test is described in which liquid $CO_2$ was pumped into the well and opened after a ten-day soak period. However, when the well was opened after ten days it produced 100% $CO_2$ and the well head choke plugged with ice. The well was shut-in for another twelve days before back production began.

The authors concluded that cyclic injection-production of $CO_2$ in bottom-water oil reservoirs does not appear to be a feasible recovery scheme. However, they concluded that a displacement scheme within injection of a slug of $CO_2$ into the oil zone some distance from the producing well appeared to be an attractive recovery scheme for some bottom-water reservoirs.

An article entitled "$CO_2$-A NEW SHOT IN ARM FOR ACID, FRAC JOBS", published in The Oil and Gas Journal, Pages 92-97 (Oct. 8, 1962) describes a typical $CO_2$ treatment in which a stream of liquid $CO_2$ joined a stream of 5% retarded acid to form a mixed stream which was delivered into the well head. A paper entitled "CARBON DIOXIDE—A MULTIPURPOSE ADDITIVE FOR EFFECTIVE WELL STIMULATION" published in Journal of Petroleum Technology, Pages 237-242 discusses a well treatment process in which liquid carbon dioxide at 0° F. and about 375 psi pressure was injected into a treating fluid just before it enters the well. The treating fluid flowed-back in 24½ hours.

A review of references dealing with well stimulation processes in which gaseous acidizing agents are delivered into the formation reveal wide spread disagreement among persons skilled in the art of the effectiveness of the various well treatment methods. It is readily apparent that the disagreement of authorities regarding what the gaseouss material does and how it should be used has impeded progress.

U.S Pat. No. 3,405,761 discloses a process wherein a slug of steam at a temperature of about 500° F. is injected into a well followed by a slug of nitrogen or air to displace water from the well before carbon dioxide is injected into the well. The carbon dioxide reacts with the steam condensate in the strata forming carbonic acid. After a soaking period of about one week, during which the carbonic acid reacts with the rocks in the strata, the injection well is opened to production.

Burnett U.S. Pat. No. 3,841,406 discloses a method of recovering oil from an oil-bearing formation in which a gas having a limited solubility in oil, e.g., carbon dioxide, is injected into the formation via a well, to increase the formation pressure, and thereafter a slug of carbon dioxide is injected via the same well. Following injection of the carbon dioxide, the well was shut in for a period of one to three days to permit the carbon dioxide to become dissolved in the oil to establish in the vicinity of the well bore a zone of oil saturated with carbon dioxide, so as to reduce the viscosity of the oil within a radial distance of about 20 to 100 feet from the well.

The technique of forming acids in situ with the oil or gas bearing strata in secondary and tertiary production wells in flooding projects are well known. Some examples of these techniques are described in U.S. Pat. Nos. 2,001,357; 3,072,185; 3,091,292; 3,252,512; 3,259,187; 3,344,858; 3,353,579; 3,392,782; 3,398,791; 3,405,761; 3,532,165; 3,929,192; and 4,250,965.

The method disclosed in the Wiseman '965 patent significantly stimulates production from the well. However, in certain well treating processes it appears that the use of an acid which is stronger than carbonic acid is needed to further increase the permeability of the strata without subjecting the production tubing string and casing to highly corrosive acid and attendant potentially ecologically damaging results of conventional acidizing processes.

SUMMARY OF THE INVENTION

It is the primary object of the present invention to inject an anhydrous acid through the well bore of an oil or gas well at a pressure sufficient to cause the acid to permeate a production strata around the well bore. The anhydrous acid is formulated to be gaseous at bottom hole temperature and pressure. A carrier may optionally be used to displace the anhydrous acid into the production strata a preselected distance away from the well bore. The gaseous acid dissolves in the connate water to form an acidic solution. The acidic solution so formed in situ etches the matrix of the formation thereby increasing the permeability of the production strata and stimulating hydrocarbon production from the well.

The anhydrous acid comprises an acid such as hydrogen fluoride, hydrogen chloride, nitrogen dioxide (which dimerizes to dinitrogen tetroxide under pressure or when liquified), glacial acetic acid, carbon dioxide, or any combination of two or more thereof. The anhydrous acid may be diluted by introducing the liquified or gaseous anhydrous acid into a liquified or gaseous anhydrous carrier, such as carbon dioxide, nitrogen, air, natural gas, methane, or any combination of two or more thereof, the mixture formulated to be gaseous at bottom hole temperature and pressure.

Producing strongly acidic solutions in the production strata surrounding the well bore could damage the formation. Two parameters are available for controlling the acidity of the acid solution produced in the production strata: (1) diluting the anhydrous acid with an anhydrous carrier where the carrier is not an acid or a weak acid so that a low concentration of anhydrous acid dissolves in the connate water and thus forms a weakly acidic solution; and (2) employing a weak acid which forms a weakly acidic solution despite a high concentration of the weak acid in the connate water. In some applications, it could be desirable to employ a weak acid, such as carbon dioxide, as both the anhydrous acid and the anhydrous carrier.

Any water or moisture remaining in the well bore or the production zone within several feet of the well bore will dissolve the passing anhydrous acid and form an acidic solution. Acidic solutions are corrosive to the materials of the well bore and reactive to the surrounding production zone. Therefore, it is a further object of the present invention to dehydrate the well bore of an oil or gas well and the production zone within several feet around the well bore prior to injecting the anhydrous acid through the well bore and into the surrounding production strata. The likelihood of damage to the production tubing string, casing, or production zone within several feet around acidic and non-corrosive anhydrous acid is pumped therethrough after these areas have been dehydrated.

To accomplish the objects of the present invention, a special type of desiccant, herein referred to as an "alcohol/polyglycol desiccant," has been discovered to be particularly suited for oil and gas well operations. In addition to outstanding dehydrating capability, the alcohol/polyglycol desiccant functions as an excellent lubricant, surfactant, water foaming agent, cleaning agent, and inhibitor against oxidation and corrosion.

In accordance with the present invention, a method is disclosed for stimulating production from a oil or gas well having a well bore, the well bore extending into a production strata and the well bore comprising a production tubing string extending through a casing, the method comprising the steps of:

(a) injecting a liquid desiccant through the well bore and into the production strata to dehydrate (i) the surfaces of the well bore which will be exposed to an anhydrous acid and (ii) the production strata in a production zone within several feet around the well bore;

(b) injecting an anhydrous acid through the well bore and into the surrounding production strata so that the anhydrous acid penetrates into the production strata and dissolves in connate water to form an acidic solution in the production strata several feet away from the well bore and outside the production zone; and (c) shutting in the well for a period sufficient (i) to allow substantially total reaction of the acidic solution with rocks in the production strata thereby increasing the permeability of the production strata and (ii) to assure that the acid is substantially spent before it contacts the production tubing string, casing, or production zone as it is recovered during subsequent production from the well.

BRIEF DESCRIPTION OF THE DRAWINGS

Drawings of a preferred embodiment of the invention are included so that the may be better understood, wherein.

Numeral references designate like parts throughout the several figures of the drawings.

DETAILED DESCRIPTION OF THE INVENTION

Figure 1:
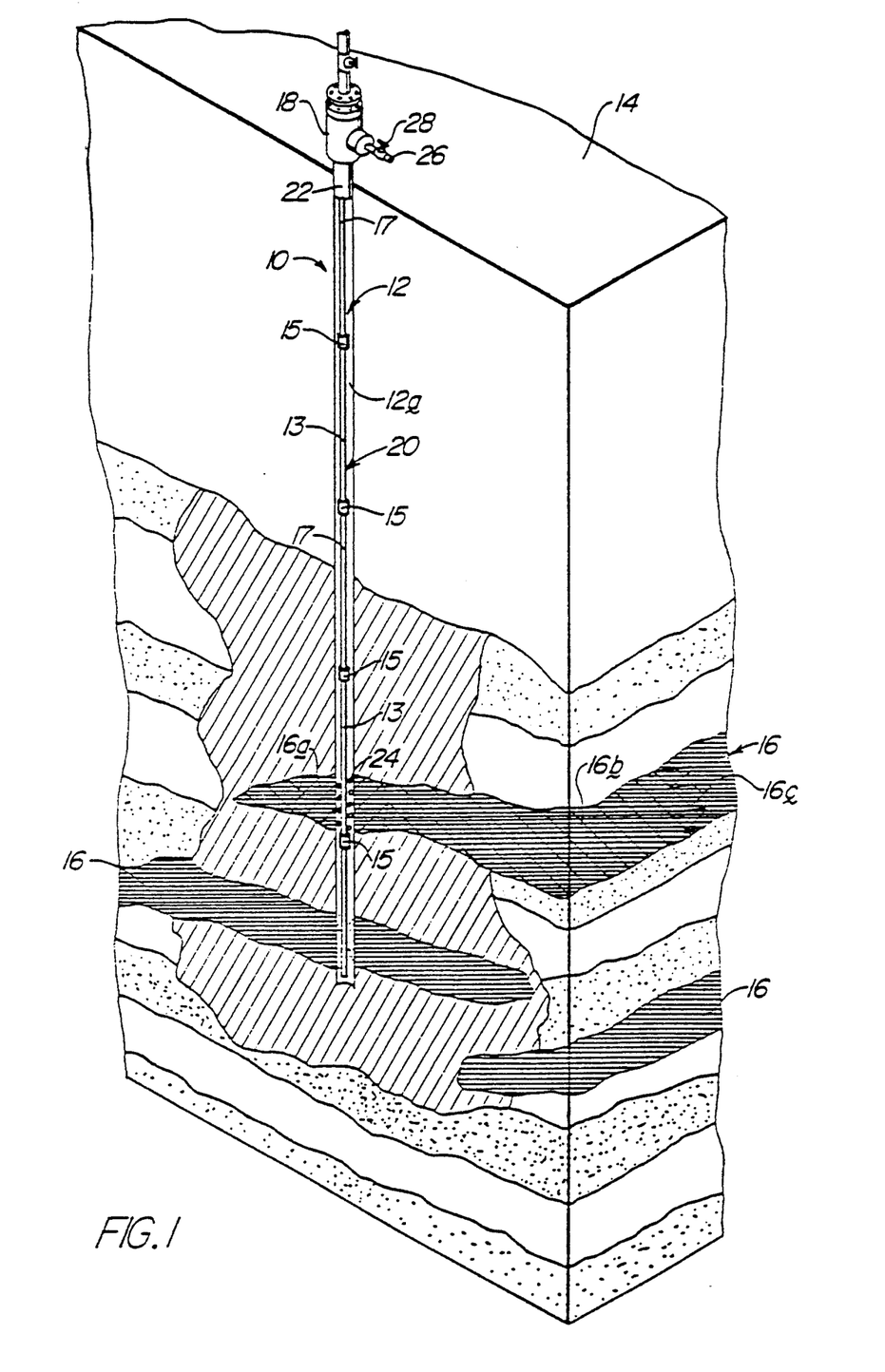
FIG. 1 is a perspective view of a typical oil or gas well extending down through a geological formation.

In FIG. 1 of the drawing, the numeral 10 generally designates an oil or gas well having a well head 18 connected to a well bore 12 which extends from the surface of the earth 14 through several geological formations including a production strata 16 bearing oil and/or gas. The well bore 12 generally comprises a production tubing string 20 extending down through a casing 22. Production tubing string 20 typically comprises a plurality of thirty foot pipe joints 13 and 17 having ends connected by collars 15. The casing 22 is similarly constructed and cemented into place. The space between the inner wall of the casing 22 and the outer wall of the production tubing string 20 forms an annulus 12a. The casing 22 has perforations 24 permitting the oil or gas to drain from the production strata 16 into the bottom of the well bore 12. The production zone 16a is the volume of the production strata 16 which is within a radius of several feet of the well bore 12, i.e., typically in the range of 5 feet to 25 feet of the well bore 12. The oil or gas which collects at the bottom of well bore 12 is transported through the production tubing string 20 to well head 18. The purpose of the figures of the drawing is illustrative only, and the drawing is not intended to limit the present invention.

For the purposes of the present description of the invention, an acid is any material which will form an acidic solution when dissolved in water. An acidic solution is any solution of water which has a pH of less than 7. A concentrated solution of a strong acid forms a strongly acidic solution, that is, a solution with a pH approaching 1. A concentrated solution of a weak acid forms a weakly acidic solution, that is, a solution with a pH less than 7 but approaching 7. A dilute solution of a strong or weak acid also forms a weakly acidic solution. Acidic solutions are corrosive to metals and react with many types of materials, including the materials of oil or gas bearing strata 16.

The method of stimulating production from a well 10 having a well bore 12, the well bore 12 extending into a production strata 16 and the well bore 12 comprising a production tubing string 20 extending through a casing 22, comprises three basic steps.

A liquid desiccant is injected through the well bore 12 and into the production strata 16 to dehydrate (i) the surfaces of the well bore 12 which will be exposed to an anhydrous acid and (ii) the production strata in a production zone 16a within several feet around the well bore 12.

An anhydrous acid is then injected through the well bore 12 and into the surrounding production strata 16 so that the anhydrous acid penetrates into the production strata 16 and dissolves in connate water to form an acidic solution in the production strata 16 several feet away from the well bore and outside the production zone 16a.

The well is shut-in for a period sufficient (i) to allow substantially total reaction of the acidic solution with rocks in the production strata 16 thereby increasing the permeability of the production strata and (ii) to assure that the acid is substantially spent before it contacts the production tubing string 20, the casing 22, or the production zone 16a as it is recovered during subsequent production from the well.

The first step of dehydrating the well bore 12 and the production zone 16a within several feet of the well bore 12 is required to protect these areas from damage by acidic solutions. One assumption is that the well bore is made of materials which are subject to acidic corrosion. However, if corrosion proof materials are used in the well bore, it would still be important to protect the production zone surrounding the well bore from damage by acidic solutions as hereinafter explained. Another assumption is that the present invention will find widest application in oil or gas wells. However, the process is effective for other types of wells. Therefore, the object of the present invention is to create an acidic solution in the production strata 16 so that the acidic solution will react with the rocks or other materials in the strata thereby increasing the permeability of the strata and stimulating production from the well 10.

Acidic solutions contacting the production tubing string 20, casing 22, or the production zone 16a could corrode and damage these areas. Therefore, the object of the present invention is to produce the acidic solution in situ so that acidic solution does not contact the production tubing string 20, the casing 22, or the production zone 16a. Producing the acid solution in situ requires that an anhydrous acid be delivered through these areas which then dissolves in the connate water of the production strata 16. However, any water remaining in the well bore 12 or in the production zone 16a will dissolve anhydrous acid which comes into contact with the water and produce an acidic solution. The problem is particularly severe with strong acids because high concentrations of strong acids in water form strongly acidic solutions. Strongly acidic solutions are correspondingly highly corrosive.

Depending on the well, it may be necessary to displace and purge gross quantities of water, other liquids, and debris from the well bore 12. A liquid or gaseous carrier may be injected into the well bore 12 and circulated in the production tubing string 20 and annulus 12a in a sufficient volume to purge water, other liquids, and debris from the well bore 12. The carrier may also be pumped into the production zone 16a to displace and purge water and other liquids from the production zone 16a out into the production strata 16. Suitable carriers include but are not limited to carbon dioxide, nitrogen, air, natural gas, methane, and any combination of two or more thereof. It is desirable, though not necessary, that the carrier for displacing the gross quantities of water, other liquids, and debris be anhydrous. It is possible to employ weak acids, such as carbon dioxide, as a carrier to displace water, other liquids, and debris from the well 10. Weak acids form weakly acidic solutions upon dissolving in water. Weakly acidic solutions attack the materials of the production tubing string 20 and the casing 22 only mildly, if at all.

However, even traces of water remaining on the surfaces of the production tubing string 20 and the casing 22 and in the production zone 16a can dissolve acids. The stronger the acid, the more damage the resulting acidic solution can do to the well bore 12 and the production zone 16a. Displacing standing water with a non-acid or weak acid carrier cannot dehydrate the production tubing string 20, the casing 22, or the production zone 16a. Water and trace moisture remains adhering to the surfaces of the tubing and trapped in crevices.

Figure 3:
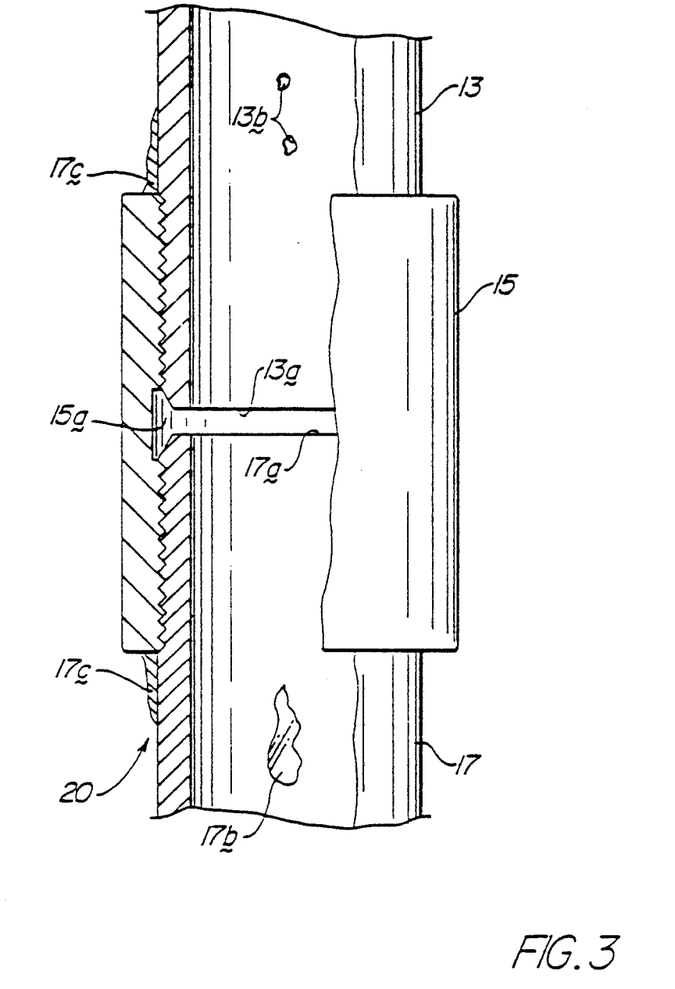
FIG. 3 is a fragmentary cross-section view of a joint in a production tubing string.

For example, FIG. 3 illustrates a collar 15 between the ends of two pipe joints 13 and 17. The collar 15 is of conventional design and comprises a cylindrical member having an internally threaded upper end which screws onto the externally threaded lower end of pipe joint 13 and an internally threaded lower end which screws onto the externally threaded upper end of pipe joint 17. Alternatively, collar 15 may be integrally formed onto the lower end of pipe joint 17 such that pipe joint 17 has an internally threaded lower end which screws onto the externally threaded upper end of pipe joint 17. Casing 22 is similarly constructed of joints of pipe connected end to end.

Liquid materials containing water tend to collect in space 15a between ends 13a and 17a of pipe joints 13 and 17, respectively. The inside wall of joint 13 often has pits 13b formed therein in which moisture may accumulate. Furthermore, thin films 17b and 17c of moisture may cover a portion of inner and outer walls of the production tubing string 20 between upper and lower ends thereof. Liquid materials containing water similarly tend to collect on the surfaces of casing 22.

FIG. 1 illustrates the production tubing string 20 extending through the casing 22 thereby forming an annulus 12a between the inner wall of casing 22 and the outer wall of production tubing string 20. Liquid containing water may be captured in crevices, grooves, pits, or other recesses formed in inner or outer walls of production tubing string 20 or casing 22. Generally, it is not necessary to dehydrate the outer walls of casing 22, except to the extent that the casing allows materials passing through the well bore to escape into the surrounding strata. However, it is desirable to dehydrate the outer walls of the casing near the perforations in the production zone 16a. A volume of standing water or other liquids may be present adjacent perforations 24 formed in casing 22. Multitudinous crevices and spaces occur in the porous production strata 16, including production zone 16a.

All of this residual water and trace moisture cannot be adequately displaced or purged with a gas. Some of this water would evaporate into an anhydrous gas used to displace the water, but much of it would not evaporate and the process would require blowing large quantities of anhydrous gas, preferably heated, to increase the evaporation of moisture, through the well bore and the production zone 16a.

Liquified anhydrous gases, such as nitrogen or carbon dioxide, could not be used to dehydrate the well bore 12 and the production zone 16a because the low temperature of these liquids would freeze the water in place. Furthermore, large quantities of the liquified gas would be required to cool the well bore 12 and the production zone 16a sufficiently to keep the gas liquified at reasonable pressures.

Therefore, a liquid desiccant is injected into the well bore 12 in an effective and sufficient amount to absorb residual water and dehydrate (i) the surfaces of the well bore 12 which will be or are likely to be exposed to an anhydrous acid and (ii) the production zone 16a within several feet around the well bore 12. The surfaces of the well bore 12 which are likely to be exposed to the anhydrous acid depend on how the acid is delivered through the well bore and how well the production tubing string 20 can be isolated from the casing 20. Normally, both the interior surfaces of the production tubing string 20 and the exterior surfaces of the production tubing string 20 and the interior surfaces of the casing which together form the annulus 12a will both be exposed to the anhydrous acid.

To accomplish its purpose, the amount of desiccant should be sufficient such that when the desiccant is quickly delivered through the well head 18 to the production tubing string 20 and/or the annulus 12a, the desiccant will form a liquid slug substantially filling a vertical segment of the production tubing string 20 and/or the annulus 12a as the desiccant descends through the tubulars of the well bore 12 to the production zone 16a. The amount of desiccant should also be sufficient such that when the desiccant is quickly delivered through production zone 16a, the desiccant will form a liquid slug substantially filling a radially extending donut shaped segment of the production zone 16a as the desiccant penetrates the production strata 16. The amount of desiccant that should be employed will be determined by the volume of the well bore 12, that is, the production tubing string 20 and/or the annulus 12a, depending on the how the anhydrous acid is delivered through the well bore, or the volume and permeable porosity of the production zone 16a, whichever is greater. An anhydrous carrier may be employed to displace the desiccant from the well bore 12, through the production zone 16a, and out into the production strata 16 several feet away from the well bore 12 and outside the production zone 16a. Normally, the anhydrous acid is employed to displace the desiccant from the well bore 12 and the production zone 16a.

Typical desiccants include acetone and alcohols being more than slightly miscible in water, such as ethyl alcohol and isopropyl alcohol.

In one aspect of the present invention, a special alcohol/polyglycol desiccant has been discovered to be particularly suited for oil and gas well operations. The alcohol/polyglycol desiccant basically comprises a mixture of alcohol and polyglycol. In addition to outstanding dehydrating capability, the alcohol/polyglycol desiccant functions as an excellent lubricant and has excellent temperature stability and is environmentally safe.

Furthermore, depending on the additives to the alcohol/polyglycol desiccant formulation, the alcohol/polyglycol desiccant may function as an excellent surfactant, water foaming agent, cleaning agent, and inhibitor against oxidation and corrosion. Generally, traditional desiccants, such as acetone and isopropyl alcohol, are not good lubricants and do not exhibit temperature stability.

Organic compounds having at least one hydridic functionality (—OH) tend to be excellent desiccants. The hydridic functionality hydrogen bonds with the water molecules. Therefore, for the purposes of the present invention, alcohol generally refers to any such hydridic compound, including di-hydridic compounds (diols) such as glycols, tri-hydridic compounds (triols) such as glycerol, and poly-hydridic compounds (polyols). Suitable alcohols include but are not limited to the group of alcohols that are miscible with water. Miscibility is the characteristic of a liquid or gas to dissolve uniformly in another liquid or gas. The miscibility of liquids depends on the respective chemical properties of the liquids. For the purposes of the present invention, miscibility is empirically defined as the property of a compound to more than slightly dissolve in water, other liquid solvent, or gas, as the case may be. Typically, these alcohols will have one to four carbon atoms. Ideally suitable alcohol desiccants include but are not limited to the group consisting of methanol, ethyl alcohol, isopropyl alcohol, propanol, ethylene glycol, and glycerol. Isopropyl alcohol is one of the most readily available. In proportion to the molecular weight of the mono-hydridic alcohols, they tend to be less polar, less miscible with water, less effective desiccants, less commercially available in large quantities, more expensive, and more environmentally hazardous, all in proportion to the molecular weight of the alcohol. Additional hydridic functionalities tend to mitigate these trends for the alcohols having multiple hydridic functionalities.

The polyglycols function in this system primarily as excellent lubricants, but also have excellent temperature stability and serve to scavenge water and moisture. The polyglycols are prepared by polymerizing ethylene oxide onto an low molecular weight alcohol such as such as ethanol, isopropyl alcohol, ethylene glycol, and/or glycerol. The polymer chains may be capped with propylene oxide as indicated by Equations 1 and 2.

The polyglycol should have the appropriate balance between viscosity and miscibility in polar solvents. Viscosity is a measure of the lubricating properties of the polyglycol. Miscibility in polar solvents is a measure of the amount of polyglycol which can dissolve in polar solvents such as water and alcohol. Miscibility in polar solvents also indicates the desiccating properties of the polyglycol. The viscosity of the polyglycol is proportional to the molecular weight of the polyglycol. The miscibility of the polyglycol in polar solvents is inversely proportional to the molecular weight of the polyglycol. To achieve the appropriate balance between viscosity and miscibility in polar solvents, the polyglycol should have a molecular weight in the range between about 500 gram/mole to about 4,000 gram/mole. The polyglycol should preferably have a molecular weight in the range between about 1,500 gram/mole to about 2,000 gram/mole.

The ratio of alcohol to polyglycol in the alcohol/polyglycol desiccant is only limited by the viscosity of the mixture. An effective amount of desiccant to dehydrate the well bore 12 and the production zone 16a within several feet of the well bore 12 is required. An effective amount of polyglycol to lubricate the well bore 12 is required. Typically, the effective volume of desiccant is larger than the effective volume of lubricant. Therefore, the ratio of the volume of alcohol to the volume of polyglycol is broadly in the range between 90:10 to 60:40. A preferred ratio is about 75:25 by volume alcohol:polyglycol.

Additives to the alcohol/polyglycol desiccant formulation can create a desiccant which also functions as an excellent surfactant, water foaming agent, cleaning agent, and inhibitor against oxidation and corrosion.

For example, neutralized phosphate esters and phosphate di-esters are excellent surfactants and inhibitors against oxidation and corrosion. They also function as lubricants and have high temperature stability. Phosphate di-esters which have been found to be particularly useful because of their availability are the phosphate di-esters of phenethyl alcohol (2-phenylethyl alcohol) and/or 1-(ethyl-2-hydroxy)-4-n-nonyl-benzene. These alcohols can be synthesized from phenol and 4-nonyl phenol, respectively, by ethoxylating with ethylene oxide as indicated by Equations 3 and 4.

(4)

Neutralized fatty acids having between 12 to 20 carbon atoms can also be added to the alcohol/polyglycol desiccant mixture. The neutralized fatty acids function as lubricant, surfactant, water foaming agent, cleaning agent, and inhibitor against oxidation and corrosion. Typical fatty acids for this purpose include but are not limited to oleic, myristic and palmitic acids.

The phosphate esters and fatty acids can be neutralized in the alcohol/polyglycol mixture with a stoichiometric excess of any base, e.g. potassium hydroxide (KOH), sodium hydroxide (NaOH) solution, or alcohol amines. Suitable alcohol amines include mono-. di-. and tri-alcohol amines where the alcohol functionalities (mono-hydridic alkyl groups) independently have in the range between two to four carbon atoms. Di-ethanol amine or triethanol amine are particularly suitable because of their ready availability. Alcohol amines such as di-ethanol amine or tri-ethanol amine have been found to be particularly useful for neutralizing the phosphate esters and fatty acids because of their ready miscibility in the polar mixture. The ammonium ion in the alcohol amine aids in forming a monolayer film on the metal surfaces of the well bore. The film protects the metal from corrosion.

The amount of these types of additives, including the neutralizing agent, which can be included in the alcohol/polyglycol desiccant mixture is only limited by how much can be incorporated into the alcohol/polyglycol system and still have a liquid mixture which is not too viscous.

The following is a broad formulation, based on efficacy alone, for an alcohol/polyglycol desiccant incorporating these other additives:

(a) in the range between about 30 percent by volume to about 90 percent by volume of at least one alcohol selected from the group consisting of organic compounds having at least one hydridic functionality and being more than slightly miscible in water;

(b) in the range between about 5 percent by volume to about 40 percent by volume of at least one polyglycol selected from the group consisting of polyglycols having a molecular weight in the range between about 500 gram/mole to about 4,000 gram/mole;

(c) in the range between about 3 percent by volume to about 20 percent by volume of at least one alcohol amine selected from the group consisting of alcohol amines having between one to three mono-hydridic alkyl functionalities where each of the mono-hydridic alkyl functionalities independently has in the range between two to four carbon atoms;

(d) in the range of about 1 percent by volume to about 15 percent by volume of at least one fatty acid selected from the group consisting of fatty acids having between 12 to 20 carbon atoms; and (e) in the range of about 1 percent by volume to about 30 percent by volume of at least one phosphate ester selected from the group consisting of phosphate mono-esters of derivatives of 2-phenylethyl alcohol and phosphate di-esters of derivatives of 2-phenylethyl alcohol. Of course, the total percentages should add up to 100% by volume.

The following is a most preferred formulation, based on efficacy and cost, of the alcohol/polyglycol desiccant mixture:

(a) about 57.5 percent by volume of isopropyl alcohol;

(b) about 20.0 percent by volume of at least one polyglycol selected from the group consisting of polyglycols having a molecular weight in the range between about 1,500 gram/mole to about 2,000 gram/mole;

(c) about 12.0 percent by volume of alcohol amine selected from the group consisting of di-ethanol amine, tri-ethanol amine, and any combination thereof;

(d) about 4.5 percent by volume of at least one fatty acid selected from the group consisting of fatty acids having between 12 and 20 carbon atoms; and (e) about 6.0 percent by volume of at least one phosphate di-ester selected from the group consisting of phosphate di-ester of phenethyl alcohol (2-phenylethyl alcohol) and phosphate di-ester of 1-(ethyl-2-hydroxy)-4-n-nonyl-benzene.

Of course, the total percentages should add up to 100% by volume.

For the second step, an anhydrous acid is injected through the well bore 12, that is, the production tubing string 20 and/or the annulus 12a, of an oil or gas well at a pressure sufficient to cause the acid to permeate throughout the production strata 16 around the well bore. The anhydrous acid is formulated to be gaseous at bottom hole temperature and pressure. A carrier may optionally be used to displace the anhydrous acid into the production strata a preselected distance away from the well bore, e.g., 50 feet, 100 feet, or more, depending on the permeability of the production strata. The gaseous acid dissolves in the connate water to form an acidic solution. The acidic solution so formed in situ etches the matrix of the formation thereby increasing the permeability of the production strata and stimulating hydrocarbon production from the well.

The anhydrous acid comprises an acid such as hydrogen fluoride, hydrogen chloride, nitrogen dioxide (which dimerizes to dinitrogen tetroxide under pressure or when liquified), glacial acetic acid, carbon dioxide, or any combination of two or more thereof. The anhydrous acid may be diluted by introducing the liquified or gaseous anhydrous acid into a liquified or gaseous anhydrous carrier, such as carbon dioxide, nitrogen, air, natural gas, methane, or any combination of two or more thereof, the mixture formulated to be gaseous at bottom hole temperature and pressure.

Producing strongly acidic solutions in the production strata 16 surrounding the well bore 12 could damage the formation. Strongly acidic solutions tend to react with more types of rock. Therefore, strongly acidic solutions will etch the formation more severely. A sufficiently strongly acidic solution may wholly destroy the formation. A weakly acidic solution does not react with so many types of rock and will more selectively etch the formation. A weakly acidic solution may increase the porosity and increase the interconnection of the porous spaces, hence the permeability of the formation. Therefore, it is important to form an acidic solution with the appropriate acidity for the particular formation.

Furthermore, the tendency of acid to dissolve in the nearest connate water is inversely proportion to the degree of acid concentration in the water. In other words, the gaseous acid will first encounter non-acidic or weakly acidic connate water. The non-acidic or weakly acidic connate water will strongly attract the gaseous acid and dissolve it until it becomes saturated with the acid. Then the gaseous acid will penetrate farther into the strata until it reaches connate water with a lower concentration of acid. Therefore, the risk to the production strata 16 is inversely proportional to the distance from the well bore.

Frequently several or repeated treatments with acid are necessary. The effects of the various acids reacting with the rocks or other materials are cumulative.

For these reasons, precautions must be taken to protect the production strata 16 which is near the well bore, and particularly the production zone 16a.

The anhydrous acid may be diluted with an anhydrous carrier which is not an acid or a weak acid so that the anhydrous acid is carried farther into the formation and less acid dissolves in the connate water. The tendency of the acid to dissolve in the connate water is proportional to the concentration of acid in the now gaseous carrier which is in contact with the water. In other words, a low concentration of the acid in the carrier reduces the tendency for the acid to dissolve in the water. Less acid dissolves in the water as the gas penetrates and permeates into the formation. A sufficient excess of carrier prevents the anhydrous acid from immediately dissolving in the connate water.

If a great excess of carrier dilutes the anhydrous acid, the gaseous acid will penetrate farther into the production strata 16 and less acid will dissolve in the connate water which forms a less concentrated solution of the acid in the water. A great excess of carrier would normally be a gaseous volume of at least three times the gaseous volume of the anhydrous acid. Suitable carrier gases for displacing the anhydrous acid include but are not limited to the group consisting of carbon dioxide, nitrogen, air, natural gas, methane, or any combination of two or more thereof. The lower concentration of the acid dissolved in the water produces a solution which is weakly acidic and therefore less reactive.

Weakly acidic solutions in the production strata 16 surrounding the well bore can also be produced by using weak acids. Even in high concentrations, weak acids will not produce strongly acidic solutions. For example, carbon dioxide forms carbonic acid in water which is much less acidic than hydrofluoric acid.

Therefore, two parameters are available for controlling the acidity of the acid solution produced in the production strata 16: (1) diluting the anhydrous acid with an anhydrous carrier which is not an acid or a weak acid, and (2) employing a weak acid which forms a weakly acidic solution despite a high concentration of the weak acid in the water. In some applications, it would be desirable t employ carbon dioxide, a weak acid, as both the anhydrous acid and the anhydrous carrier.

The weakly acidic solutions react relatively slowly with the rock in the strata which allows the acidic solution to penetrate farther into the production strata 16 by the process of diffusion and/or in response to the pressure of subsequently injected carrier and/or anhydrous acid. Weakly acidic solutions also tend to react more selectively, increasing the porosity and increasing the interconnection between the porous spaces, hence the permeability of the rock without destroying the rock formation wholesale.

Once the anhydrous acid has been injected through the well bore 12 and into the production strata 16, the anhydrous acid may be displaced from the well bore 12 by injecting a sufficient volume of a non-acid carrier, such as nitrogen, or a weak acid carrier, such as carbon dioxide. This first displacement would help protect the production tubing string 20 and the casing 22 against corrosion in case any water penetrates back into the well bore 12. The anhydrous acid may be displaced a preselected distance from the well bore 12 by injecting a sufficient volume of the carrier. This secondary displacement protects the production zone 16a and the portion of the production strata 16 nearest to the well bore 12. It also allows the acid to increase the permeability of the production strata a preselected distance from the well bore. Suitable carrier gases for displacing the anhydrous acid include but are not limited to the group consisting of carbon dioxide, nitrogen, air, natural gas, methane, or any combination of two or more thereof. Displacement of weak acids, like carbon dioxide and acetic acid, is not nearly as critical because these acids produce weakly acidic solutions upon dissolving in water. These weakly acidic solutions attack the materials of the production tubing string 20, the casing 22, and the production zone 16a only mildly, if at all.

For the third step, the acid solution is shut in for a period of time sufficient to allow the acid to become spent before it is allowed to flow back through the dehydrated zone 16a and the well bore 12. Shutting in the well may be accomplished by any of a number of different means. For example, simply sealing off the well head or by maintaining a positive pressure through the well head. The rate of reaction with the material in the production strata 16 is proportional to the strength of the acidic solution. Therefore, a weakly acidic solution must be shut in for a longer period than a strongly acidic solution. The shut in period may range between several hours to several weeks.

After a suitable shut in period, production from the well may be resumed. The properly increased permeability of the production strata 16 will result in stimulated hydrocarbon production.

Though the theoretical explanation for the effectiveness of the present invention with respect to the acidizing step is expected to be that the acid reacts with the materials of the production strata to increase the permeability of the strata, the invention is not limited by this theoretical explanation.

Figure 2:
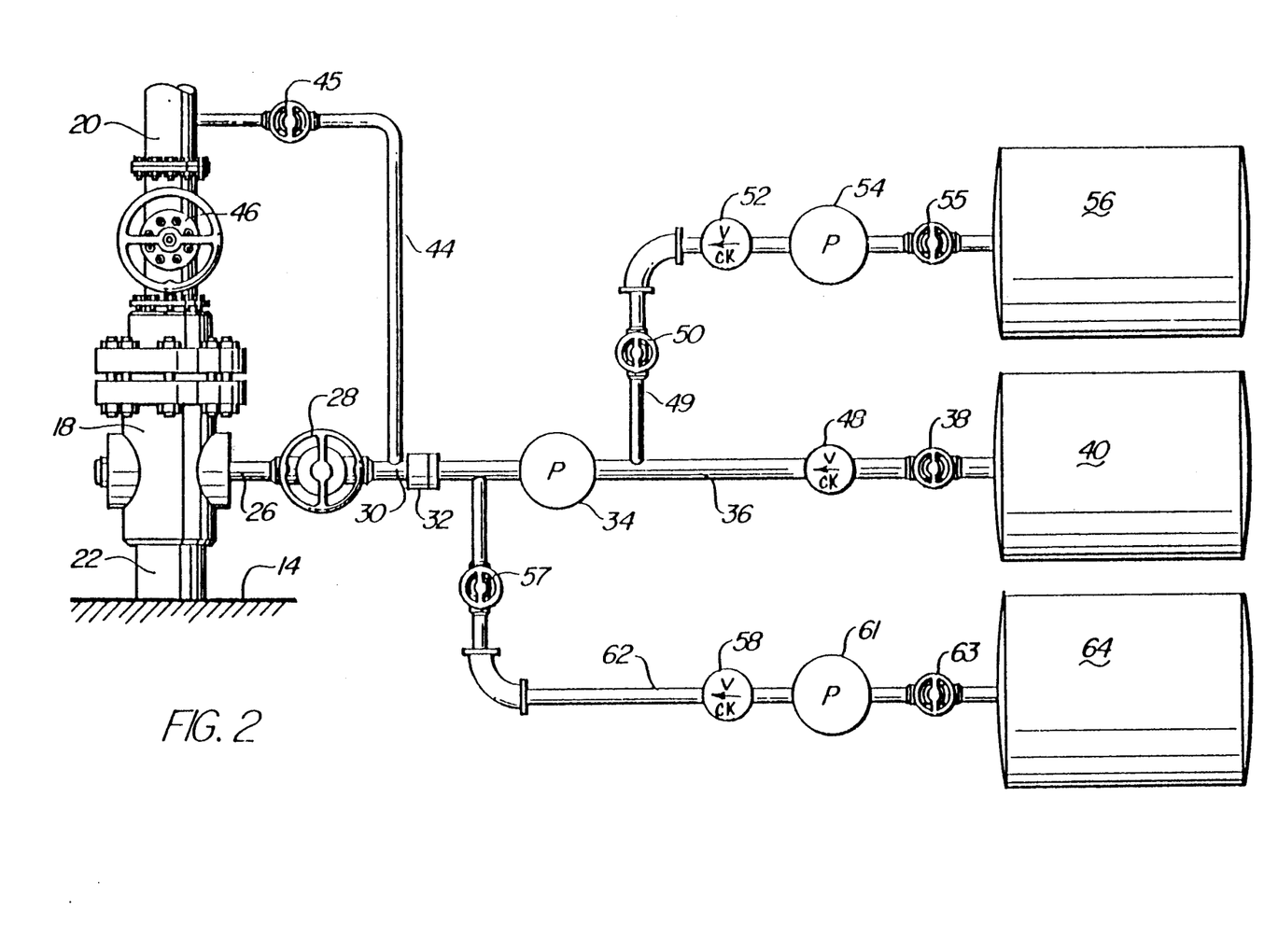
FIG. 2 is a diagram of an apparatus for injecting an anhydrous acid, a carrier, and/or a desiccant into a well.

As shown in FIG. 2, an apparatus is provided for accomplishing the method of the present invention for stimulating hydrocarbon production from an oil or gas well 10 having a well bore 12, the well bore 12 extending into a production strata 16 and the well bore 12 comprising a production tubing string 20 extending through a casing 22. The method comprises the steps of:

(a) injecting a liquid desiccant into the production strata 16 to dehydrate the production strata in a production zone 16a within several feet around the well bore;

(b) injecting an anhydrous acid through the dehydrated production zone 16a into the surrounding production strata 16 so that the anhydrous acid penetrates into the production strata 16 and dissolves in connate water to form an acidic solution in the production strata 16 several feet away from the well bore and outside the production zone 16a; and (c) shutting in the well for a period sufficient (i) to allow substantially total reaction of the acidic solution with materials in the production strata 16 thereby increasing the permeability of the production strata and (ii) to assure that the acid is substantially spent before it contacts the production tubing string 20, casing 22, or production zone 16a as it is recovered during subsequent production from the well 10.

Pressurized tanks 40, 64 and 56 contain substantially anhydrous materials used for performing the improved method for stimulating hydrocarbon production from a well. Additional tanks and materials may be employed depending upon the particular well and formation to be treated.

The well 10 illustrated in FIG. 1 of the drawing may have, for example, a depth of 5,000 feet extending into a production strata 16 wherein the formation is dolomite having a production zone 16a height of ten feet, a bottom hole temperature of 110° F., a porosity of 10% containing 45% Sw. Dolomite is a carbonate of calcium and magnesium of the composition $CaCO_3$ $MgCO_3$, differentiated from limestone by having a minimum of 45% $MgCO_2$. It occurs widely distributed in coarse, granular masses or in fine-grained compact form known as pearl spar.

A typical casing 22 has an outside diameter of 5½ inches while tubing string 20 has an outside diameter of 2⅞ inches. The volume of tubing string 20 is, for example, 28.95 barrels while the volume of the annulus 12a is, for example, 79 barrels wherein one barrel is equivalent to 55 gallons.

Referring to FIG. 2 of the drawing, tank 40 contains an anhydrous carrier such as liquid carbon dioxide ($CO_2$) or nitrogen ($N_2$) which is also used for displacing and purging the well of standing water or other contaminants and flushing the tubing 20 or the annulus 12a following treatment of the well and before the well is shut-in for isolating the acidic solution from the production tubing string 20, casing 22, and production zone 16a for sufficient time for the acid to become spent.

Tank 56 is a source of a suitable anhydrous acid, such as hydrogen fluoride (HF), hydrogen chloride (HCl), nitrogen dioxide (dimerizes to dinitrogen tetroxide under pressure or when liquified), acetic acid, carbon dioxide ($CO_2$), or any combination of two or more thereof. The particular acid may vary depending upon the composition of materials forming the oil or gas bearing strata 16. If the formation is sandstone, hydrogen fluoride is preferable unless the cementing material for the casing 22 contains carbonate. If the formation is dolomite, carbon dioxide is preferable. If the formation is limestone, hydrogen chloride is preferable.

Anhydrous hydrogen fluoride is commercially available in steel cylinders under a pressure of 1,000 psi. The boiling point of anhydrous hydrogen fluoride is 19.5° C., the melting point is minus 83.55° C., and the density of the anhydrous liquid is 0.988 g/cm³ at 14° C. and 1 atmosphere pressure. In the anhydrous state, hydrogen fluoride is an extremely strong acid which reacts only with alkali metals, alkaline earth metals and with thallium.

Hydrofluoric acid is a water solution of hydrogen fluoride, HF. It is a colorless, fuming liquid, highly acidic, highly corrosive, and highly caustic. It dissolves most metals except gold and platinum, and also dissolves glass, stoneware and organic material. Hydrofluoric acid is widely used for etching glass, cleaning metals, and for dissolving sand from castings.

Anhydrous hydrogen chloride is commercially available in steel cylinders under a pressure of 1,000 psi. The boiling point of anhydrous hydrogen chloride is minus 85.05° C., the melting point is minus 114.2° C., and the specific density of the gas relative to air is 1.269. In the anhydrous state, hydrogen chloride is a very strong acid. It is made by the action of sulfuric acid on sodium chloride.

Hydrochloric acid is a water solution of hydrogen chloride, HCl, and is a colorless or yellowish fuming liquid, with pungent, poisonous fumes. The commercial acid is usually 20° Be equalling 31.45% HCl, and has a specific gravity of 1.16. Hydrochloric acid is widely used in commercial applications.

Anhydrous nitrogen dioxide is commercially available as liquid dinitrogen tetroxide in steel cylinders under a pressure of 1,000 psi. The boiling point of anhydrous nitrogen dioxide is 21.1° C. and the melting point is minus 9.3° C. In the anhydrous state, nitrogen dioxide is a very strong acid.

Nitric acid is a water solution of nitrogen dioxide. It is a colorless, fuming liquid, highly acidic, highly corrosive, and highly caustic. Nitric acid is widely used commercially.

Anhydrous glacial acetic acid is commercially available as a liquid. Glacial acetic acid is a clear, colorless liquid with a pungent odor. The boiling point of glacial acetic acid is 118° C., the melting point is 16.63° C., and the specific gravity of the liquid is 1.049. Glacial acetic acid is a weak acid.

Acetic acid is a water solution of glacial acetic acid. It is a colorless liquid, weakly acidic, weakly corrosive, and weakly caustic. Acetic acid is widely used commercially.

Anhydrous carbon dioxide is commercially available in steel cylinders under a pressure of 1,000 psi. The melting point of carbon dioxide is minus 78.5° C. (sublimes) and the specific density relative to air is 1.53. Carbon dioxide is a weak acid.

Carbonic acid is a water solution of carbon dioxide. It is a colorless liquid, weakly acidic, weakly corrosive, and weakly caustic. Carbonic acid is widely used commercially.

Tank 64 preferably contains a desiccant, such as acetone, alcohol, or the alcohol/polyglycol desiccant of the present invention which are used for dehydrating or drying the inner and outer surfaces of tubing string 20, the surfaces of casing 22, and/or the production zone 16a having a radius of, for example, five feet outwardly from the lower end of the well bore 12 in production strata 16.

As illustrated in FIG. 2 of the drawing, tanks 40, 64, and 56 have valves 38, 63, and 55, respectively, mounted at the outlet thereof and are preferably vehicular mounted to facilitate delivery of materials to the well site.

Each of the vehicular mounted tanks 40, 64, and 56 preferably is provided with a constant displacement transfer pump 34, 61, and 54, respectively, which are operated independently by separate variable speed motors for controlling the proportion of the contents of tanks 40, 64, and 56 to be injected into the well 10 and the sequence at which the various materials are injected.

A first pipe 26 has a valve 28 mounted therewith to control fluid communication into the annulus 12a of the well bore 12 formed between production tubing string 20 and casing 22. A second pipe 30 is mounted with valve 28 and outlet end 32 of mixing pump 34. The inlet end 36 of mixing pump 34 is coupled through a check valve 48 to a valve 38 mounted in fluid communication with moveable tank 40 which is a source of liquid $CO_2$, liquid $N_2$ or other suitable anhydrous carrier.

An inverted L-shaped pipe 44, having a valve 45 mounted therewith to control the passage of fluid therethrough, is connected to second pipe 30 and production tubing string 20. Between the pump outlet 30 and the valve 38, a check valve 48 is mounted to prevent flow back to tank 40.

A pipe 62 is mounted with valve 57 and check valve 58 onto pump inlet 36 to control passage of materials therethrough and from pump 61 mounted with valve 63 to moveable tank 64 which contains the desiccant material.

A flow line 49, having a valve 50, check valve 52, transfer pump 54 and valve 55 mounted therein, extends between tank 56 of anhydrous acids and pump inlet 36 and communicates with the interior of production tubing string 20 through pipe 44 and the annulus 12a through pipe 26.

Pipe 49 through which anhydrous acid is delivered by transfer pump 54 from tank 56 is connected to the suction side of mixing pump 34 at inlet 36 to facilitate injection of anhydrous acid into a stream of carrier, such as liquified carbon dioxide or liquified nitrogen, flowing through pipe 36 from tank 40. The anhydrous acid from tank 56 is mixed with the carrier from tank 40 which moves through mixing pump 34 for injection into the production tubing string 20 or the annulus 12a. Valves 38 and 55 may be opened or closed independently to permit injection of either carrier material from tank 40 or anhydrous acid from tank 56 into well 10, either separately or in combination.

Transfer line 62 from tank 64 containing desiccant material is preferably connected to the outlet side of mixing pump 34 since a volume of desiccant may be injected either before or after a volume of material from tanks 40 and 56 is delivered to pipe 30 for injection into either the interior of the production tubing string 20, the annulus 12a, or into both the production tubing string 20 and the annulus 12a simultaneously.

In operation, valves 45, 50 and 57 are closed and valves 28 and 38 opened. Pump 34 is then activated for injecting carrier from tank 40 down the annulus 12a of well bore 12, which delivers the carrier down casing 22 to the bottom of well bore 12. Valve 46 is then opened to permit passage of the carrier up production tubing string 20 and thereby removes liquid, scale and other impurities from the bottom of the well bore.

The volume of anhydrous carrier delivered from tank 40 for purging and flushing the production tubing string and the annulus 12a of water, water containing liquids, other liquids, and debris depends upon the depth of the well and the combined volume of production tubing string 20 and the annulus 12a. Generally, the volume of anhydrous carrier should be equal to or greater than the total volume of the production tubing string 20, the annulus 12a, or the combined volume of the two. For example, for a well having a depth of 5,000 feet, production tubing string 20 having a volume of approximately 30 barrels and an annulus 12a having a volume of approximately 80 barrels, a total volume of at least 110 barrels of carrier would preferably be circulated rather quickly through the production tubing string 20 and the annulus 12a.

As hereinbefore described and illustrated in FIG. 3 of the drawing, moisture tends to collect in grooves and crevices in surfaces of tubing string 20 and casing 22. It also tends to collect in the spaces and pores of the production zone 16a. To prevent reaction between the acids which will flow through the production tubing string 20 or the annulus 12a and the production zone 16a, valves 57 and 63 are opened and pump 61 is energized for delivering a volume of, for example, 600 gallons of desiccant through pipes 26 and 44 into the production tubing string 20 and/or the annulus 12a. The desiccant moving through the tubulars absorbs moisture thereby drying or dehydrating surfaces of the tubulars. The desiccant material flows to the bottom of the well bore 12 and into production zone 16a.

The following is a typical well treating design:
dolomite formation at about 5700 feet depth
10 feet net pay thickness
porosity 10%
$S_w$ 45%
oil grav. 35° API
BHT 110°
BHP 600 psi
$5\frac{1}{2}\Delta$ casing, $2\frac{7}{8}\Delta$ tubing
$CO_2$ miscibility in water—95 cu. ft. per bbl.
$CO_2$ miscibility in oil—400 cu. ft. per bbl.

Job design called for 100 feet radius $CO_2$ penetration and at least 57 feet radius acid penetration measured from the well bore 12. Assuming a homogenous reservoir and assuming that penetration will be essentially horizontal in nature, job requirements are for 600 gallons desiccant, 85 tons $CO_2$, and 11,300 pounds HCl (equivalent to 10,000 gallons of 15% HCl).

Pumping schedule:
displace well with 28 tons of carrier,
pump an additional 5 ton pad of carrier,
pump 22 tons $CO_2$ plus 25% HCl by weight, and
displace anhydrous acid with 20 tons of carrier.

From the foregoing it should be readily apparent that at this point gross quantities of water, other liquids, and debris have been purged from the well bore 12 and that the surfaces of the production tubing string 20 and the surfaces of casing 22 have all been dehydrated. A thin monolayer film of the alcohol/polyglycol desiccant is formed on the surfaces of the well bore which protects these surfaces from corrosion.

Immediately following or simultaneously with the delivery of the desiccant from tank 64 into the well, valve 38 is opened and pump 34 is energized for delivering a sufficient volume of anhydrous carrier into the well for causing the desiccant to flow through perforations 24 into the hydrocarbon bearing strata 16 to absorb moisture in a radius of, for example, five feet around the well bore 12 for dehydrating the production zone 16a adjacent the outside of casing 22.

Valves 54 and 63 are then closed to terminate further transfer of desiccant from tank 64 through pump 61, and valves 50 and 55 are opened to permit the anhydrous acid to be transferred through pump 54 from tank 56 into the stream of carrier moving through pipe 36 from tank 40. The carrier may then be pumped down either or both the annulus 12a of the well bore 12 or production tubing string 20 to the bottom of the well bore. During this process, a predetermined amount of the anhydrous acid is injected into the carrier stream by opening valves 50 and 55, and activating pump 54 to permit withdrawal of the anhydrous acid from tank 56. Sufficient carrier material is injected down the well to provide a pressure enabling the gaseous carrier, formed by the vaporization of the liquid carrier, and the anhydrous acids to permeate through production strata 16 and dissolve into the connate water, producing an acidic solution of the acid.

When sufficient carrier and anhydrous acid have been added, valves 28 and 46 are closed to shut in the well for a period of time enabling the acid solution to react with the rocks or other materials in the production strata 16 and thereby increase the permeability of the strata, which in turn stimulates the production of oil and/or gas out from the formation.

Since the reaction time of the weakly acidic solution is relatively slow, it may penetrate more deeply into the production strata 16 before spending itself. Additionally, any strong acid dissolved in the connate water reacts more slowly with the rocks or other materials in the formation in the presence of a great excess of a weak acid, such as the carbon dioxide carrier, permitting deeper penetration of the strong acid.

Since well logging techniques and core analysis permit the quantity of connate water contained within the production strata 16 to be determined, it is possible to determine the quantities of anhydrous carrier and anhydrous acid necessary to be injected into the well 10 to produce the appropriately acidic solution a selected distance outwardly from the bottom of the well bore 12. Likewise, the amount of anhydrous acid is determined to enhance the overall stimulation effect. Accordingly, a quantity and proportion of the anhydrous carrier and anhydrous acid is chosen for injection into the well sufficient to form reactive acid a preselected distance from the bottom of well bore 12 in zone 16b illustrated in FIG. 1 of the drawing around the dehydrated zone 16a.

What is claimed is:

1. A method of stimulating production from a well having a well bore, the well extending into a production strata, the method comprising the steps of:
   (a) injecting an effective amount of a liquid desiccant into the production strata to dehydrate a production zone around the well;
   (b) injecting an anhydrous acid into the production strata so that the anhydrous acid penetrates into the production strata and dissolves in water in the production strata to form an acidic solution in the production strata a substantial distance away from the well bore and outside the production zone; and
   (c) shutting in the well for a period sufficient (i) to allow substantially total reaction of the acidic solution with materials in the production strata thereby increasing the permeability of the production strata and (ii) to assure that the acid is substantially spent before it contacts the production tubing string, casing, or production zone as it is recovered during subsequent production from the well.

2. The method of claim 1 wherein the amount of liquid desiccant is sufficient such that when the desiccant is quickly delivered through the production zone, the desiccant will form a liquid slug substantially filling a radially extending segment of the production zone as the desiccant moves out into the production strata.

3. The method of claim 1 wherein the step of injecting a desiccant further comprises the step of injecting an effective amount of a liquid desiccant into the well bore to dehydrate the surfaces of the well bore which will be exposed to an anhydrous acid.

4. The method of claim 3 wherein the amount of liquid desiccant is sufficient such that when the desiccant is quickly delivered into the well bore, the desiccant will form a liquid slug substantially filling a vertical segment of the well bore as the desiccant descends through the production tubing string and the annulus between the inner wall of the casing and the outer wall of the production tubing string.

5. The method of claim 1 wherein the desiccant is selected from the group consisting of acetone, alcohol, and any combination of two or more thereof.

6. The method of claim 1 wherein the step of injecting a desiccant into the production strata further comprises the step of:
   displacing gross quantities of water, other liquids, and debris from the production zone within several feet of the well bore by pumping a sufficient amount of a carrier into the production zone within several feet of the well bore.

7. The method of claim 6 wherein the carrier for displacing gross quantities of water, other liquids, and debris is independently selected from the group consisting of carbon dioxide, nitrogen, air, natural gas, methane, or any combination of two or more thereof.

8. The method of claim 1 wherein the step of injecting a desiccant into the production strata further comprises the step of:
   displacing gross quantities of water, other liquids, and debris from the well bore by circulating a sufficient amount of a carrier through the well bore.

9. The method of claim 8 wherein the carrier for displacing gross quantities of water, other liquids, and debris from the well bore is independently selected from the group consisting of carbon dioxide, nitrogen, air, natural gas, methane, or any combination of two or more thereof.

10. The method of claim 1 wherein the anhydrous acid is selected from the group consisting of hydrogen fluoride, hydrogen chloride, nitrogen dioxide, glacial acetic acid, carbon dioxide, or any combination of two or more thereof.

11. The method of claim 1 wherein the anhydrous acid is hydrogen fluoride.

12. The method of claim 1 wherein the anhydrous acid is diluted with a great excess of an anhydrous carrier.

13. The method of claim 12 wherein the anhydrous carrier for diluting the anhydrous acid is independently selected from the group consisting of carbon dioxide, nitrogen, air, natural gas, methane, or any combination of two or more thereof.

14. The method of claim 12 wherein the anhydrous carrier for diluting the anhydrous acid is carbon dioxide.

15. The method of claim 1 wherein the step of injecting an anhydrous acid further comprises the step of:
   injecting a quantity a quantity of a carrier into the well which is sufficient (i) to displace the anhydrous acid from the well bore and the production zone within several feet of the well bore and (ii) to cause the anhydrous acid to penetrate into the production strata adjacent the production zone such that the anhydrous acid dissolves in water in the production strata to form an acidic solution a predetermined distance away from the well bore.

16. The method of claim 15 wherein the carrier for displacing the anhydrous acid is independently selected from the group consisting of carbon dioxide, nitrogen, air, natural gas, methane, or any combination of two or more thereof.

17. The method of claim 15 wherein the carrier for displacing the anhydrous acid is carbon dioxide.

18. A method of stimulating production from a well having a well bore, the well extending into a production strata, the method comprising the steps of:
   (a) injecting a sufficient amount of liquid desiccant such that when the desiccant is quickly delivered through the production zone, the desiccant will form a liquid slug substantially filling a radially extending segment of the production zone as the desiccant moves out into the production strata, thereby dehydrating the production zone within several feet around the well bore;
   (b) injecting an anhydrous acid into the production strata so that the anhydrous acid penetrates into the production strata and dissolves in water in the production strata to form an acidic solution in the production strata several feet away from the well bore and outside the production zone; and
   (c) retaining the acid in the production strata for a period sufficient (i) to allow substantially total reaction of the acidic solution with materials in the production strata thereby increasing the permeability of the production strata and (ii) to assure that the acid is substantially spent before it flows to the well.

19. The method of claim 18 wherein the desiccant is selected from the group consisting of acetone, alcohol, and any combination of two or more thereof.

20. A method of stimulating hydrocarbon production from a well having a well bore, the well bore extending into a production strata and the well bore comprising a production tubing string extending through a casing, the method comprising the steps of:
   (a) injecting an effective amount of a liquid desiccant through the well bore and into the production strata to dehydrate the surfaces of the well bore which will be exposed to an anhydrous acid and the production strata in a production zone within several feet around the well bore, wherein the liquid desiccant is an alcohol/polyglycol desiccant comprising:
      (i) in the range between about 30 percent by volume to about 90 percent by volume of at least one alcohol selected from the group consisting of organic compounds having at least one hydridic functionality and being miscible in water;
      (ii) in the range between about 5 percent by volume to about 40 percent by volume of at least one polyglycol selected from the group consisting of polyglycols having a molecular weight in the range between about 500 gram/mole to about 4,000 gram/mole.
      (iii) in the range between about 3 percent by volume to about 20 percent by volume of at least one alcohol amine selected from the group consisting of alcohol amines having between one to three mono-hydridic alkyl functionalities where each of the mono-hydridic alkyl functionalities independently has in the range between two to four carbon atoms;
      (iv) in the range of about 1 percent by volume to about 15 percent by volume of at least one fatty acid selected from the group consisting of fatty acids having between 12 to 20 carbon atoms; and
      (v) in the range of about 1 percent by volume to about 20 percent by volume of at least one phosphate ester selected from the group consisting of phosphate mono-esters of derivatives of 2-phenylethyl alcohol and phosphate di-esters of derivatives of 2-phenylethyl alcohol;
   (b) injecting an anhydrous acid through the well bore and into the surrounding production strata so that the anhydrous acid penetrates into the production strata and dissolves in water in the production strata to form an acidic solution in the production strata several feet away from the well bore and outside the production zone; and
   (c) shutting in the well for a period sufficient to allow reaction of the acidic solution with materials in the production strata thereby increasing the permeability of the production strata.

21. A method of stimulating production from a well having a well bore, the well extending into a production strata, the method comprising the steps of:
   (a) injecting an effective amount of a liquid desiccant into the production strata to dehydrate a production zone around the well wherein the desiccant is an alcohol/polyglycol desiccant comprising:
      (i) in the range between about 60 percent by volume to about 90 percent by volume of at least one alcohol selected from the group consisting of organic compounds having at least one hydridic functionality and being miscible in water; and
      (ii) in the range between about 10 percent by volume to about 40 percent by volume of at least one polyglycol selected from the group consisting of polyglycols having a molecular weight in the range between about 500 gram/mole to about 4,000 gram/mole;
   (b) injecting an anhydrous acid into the production strata so that the anhydrous acid penetrates into the production strata and dissolves in water in the production strata to form an acidic solution in the production strata a substantial distance away from the well bore and outside the production zone; and
   (c) shutting in the well for a period sufficient to allow substantially total reaction of the acidic solution with materials in the production strata thereby increasing the permeability of the production strata and to assure that the acid is substantially spend before it contacts the production tubing string, casing, or production zone as it is recovered during subsequent production from the well.

22. A method of stimulating production from a well having a well bore, the well extending into a production strata, the method comprising the steps of:
   (a) injecting an effective amount of a liquid desiccant into the production strata to dehydrate a production zone around the well wherein the desiccant is an alcohol/polyglycol desiccant comprising:
      (i) in the range between about 30 percent by volume to about 90 percent by volume of at least one alcohol selected from the group consisting of organic compounds having at least one hydridic functionality and being miscible in water;
      (ii) in the range between about 5 percent by volume to about 40 percent by volume of at least one polyglycol selected from the group consisting of polyglycols having a molecular weight in the range between about 500 gram/mole to about 4,000 gram/mole.

(iii) in the range between about 3 percent by volume to about 20 percent by volume of at least one alcohol amine selected from the group consisting of alcohol amines having between one to three mono-hydridic alkyl functionalities where each of the mono-hydridic alkyl functionalities independently has in the range between two to four carbon atoms;

(iv) in the range of about 2 percent by volume to about 15 percent by volume of at least one fatty acid selected from the group consisting of fatty acids having between 12 to 20 carbon atoms; and (v) in the range of about 1 percent by volume to about 30 percent by volume of at least one phosphate ester selected from the group consisting of phosphate mono-esters of derivatives of 2-phenylethyl alcohol and phosphate di-esters of derivatives of 2-phenylethyl alcohol;

(b) injecting an anhydrous acid into the production strata so that the anhydrous acid penetrates into the production strata and dissolves in water in the production strata to form an acidic solution in the production strata a substantial distance away from the well bore and outside the production zone; and (c) shutting in the well for a period sufficient to allow substantially total reaction of the acidic solution with materials in the production strata thereby increasing the permeability of the production strata and to assure that the acid is substantially spent before it contacts the production tubing string, casing, or production zone as it is recovered during subsequent production from the well.

23. A method of stimulating production from a well having a well bore, the well extending into a production strata, the method comprising the steps of:

(a) injecting an effective amount of a liquid desiccant into the production strata to dehydrate a production zone around the well wherein the desiccant is an alcohol/polyglycol desiccant comprising:

(i) about 57.5 percent by volume of isopropyl alcohol;

(ii) about 20.0 percent by volume of at least one polyglycol selected from the group consisting of polyglycols having a molecular weight in the range between about 1,500 gram/mole to about 2,000 gram/mole;

(iii) about 12.0 percent by volume of alcohol amine selected from the group consisting of di-ethanol amine, tri-ethanol amine, and any combination thereof;

(iv) about 4.5 percent by volume of at least one fatty acid selected from the group consisting of fatty acids having between 12 and 20 carbon atoms; and (v) about 6.0 percent by volume of at least one phosphate di-ester selected from the group of phosphate di-ester of phenethyl alcohol (2-phenylethyl alcohol) and phosphate di-ester of 1-(ethyl-2-hydroxy)-4-n-nonyl-benzene;

(b) injecting an anhydrous acid into the production strata so that the anhydrous acid penetrates into the production strata and dissolves in water in the production strata to form an acidic solution in the production strata a substantial distance away from the well bore and outside the production zone; and (c) shutting in the well for a period sufficient to allow substantially total reaction on the acidic solution with materials in the production strata thereby increasing the permeability of the production strata and to assure that the acid is substantially spent before it contacts the production tubing string, casing, or production zone as it is recovered during subsequent production from the well.

24. A method of stimulating production from a well having a well bore, the well extending into a production strata, the method comprising the steps of:

(a) injecting a sufficient amount of liquid desiccant such that when the desiccant is quickly delivered through the production zone, the desiccant will form a liquid slug substantially filling a radially extending segment of the production zones as the desiccant moves out into the production strata, thereby dehydrating the production zone within several feet around the well bore, wherein the desiccant is an alcohol/polyglycol desiccant comprising:

(i) in the range between about 60 percent by volume to about 90 percent by volume of at least one alcohol selected from the group consisting of organic compounds having at least one hydridic functionality and being miscible in water; and (ii) in the range between about 10 percent by volume to about 40 percent by volume of at least one polyglycol selected from the group consisting of polyglycols having a molecular weight in the range between about 500 gram/mole to about 4,000 gram/mole;

(b) injecting an anhydrous acid in the production strata so that the anhydrous acid penetrates into the production strata and dissolves in water in the production strata to form an acidic solution in the production strata several feet away from the well bore and outside the production zone; and (c) retaining the acid in the production strata for a period sufficient (i) to allow substantially total reaction of the acidic solution with materials in the production strata thereby increasing the permeability of the production strata and (ii) to assure that the acid is substantially spent before it flows to the well.

25. A method of stimulating production from a well having a well bore, the well extending into a production strata, the method comprising the steps of:

(a) injecting a sufficient amount of liquid desiccant such that when the desiccant is quickly delivered through the production zone, the desiccant will form a liquid slug substantially filling a radially extending segment of the production zone as the desiccant moves out into the production strata, thereby dehydrating the production zone within several feet around the well bore, wherein the desiccant is an alcohol/polyglycol desiccant comprising:

(i) in the range between about 20 percent by volume to about 90 percent by volume of at least one alcohol selected from the group consisting of organic compounds having at least one hydridic functionality and being miscible in water;

(ii) in the range between about 5 percent by volume to about 40 percent by volume of at least one polyglycol selected from the group consisting of polyglycols having a molecular weight in the range between about 500 gram/mole to about 4,000 gram/mole.

(iii) in the range between about 3 percent by volume to about 20 percent by volume of at least one alcohol amine selected from the group consisting of alcohol amines having between one to three mono-hydridic alkyl functionalities where each of the mono-hydridic alkyl functionalities independently has in the range between two to four carbon atoms;

(iv) in the range of about 1 percent by volume to about 15 percent by volume of at least one fatty acid selected from the group consisting of fatty acids having between 12 to 20 carbon atoms; and (v) in the range of about 1 percent by volume to about 30 percent by volume of at least one phosphate ester selected from the group consisting of phosphate mono-esters of derivatives of 2-phenylethyl alcohol and phosphate di-esters of derivatives of 2-phenylethyl alcohol;

(b) injecting an anhydrous acid into the production strata so that the anhydrous acid penetrates into the production strata and dissolves in water in the production strata to form an acidic solution in the production strata several feet away from the well bore and outside the production zone; and (c) retaining the acid in the production strata for a period sufficient (i) to allow substantially total reaction of the acidic solution with materials in the production strata thereby increasing the permeability of the production strata and (ii) to assure that the acid is substantially spent before it flows to the well.

26. A method of stimulating production from a well having a well bore, the well extending into a production strata, the method comprising the steps of:

(a) injecting a sufficient amount of liquid desiccant such that when the desiccant is quickly delivered through the production zone, the desiccant will form a liquid slug substantially filling a radially extending segment of the production zone as the desiccant moves out into the production strata, thereby dehydrating the production zone within several feet around the well bore, wherein the desiccant is an alcohol/polyglycol desiccant comprising:

(i) about 57.5 percent by volume of isopropyl alcohol;

(ii) about 20.0 percent by volume of at least one polyglycol selected from the group consisting of polyglycols having a molecular weight in the range between about 1,500 gram/mole to about 2,000 gram/mole;

(iii) about 12.0 percent by volume of alcohol amine selected from the group consisting of di-ethanol amine, tri-ethanol amine, and any combination thereof;

(iv) about 4.5 percent by volume of at least one fatty acid selected from the group consisting of fatty acids having between 12 and 20 carbon atoms; and (v) about 6.0 percent by volume of at least one phosphate di-ester selected from the group of phosphate di-ester of phenethyl alcohol (2-phenylethyl alcohol) and phosphate di-ester of 1-(ethyl-2-hydroxy)-4-n-nonyl-benzene;

(b) injecting an anhydrous acid into the production strata so that the anhydrous acid penetrates into the production strata and dissolves in eater in the production strata to form an acidic solution in the production strata several feet away from the well bore and outside the production zone; and (c) retaining the acid in the production strata for a period sufficient (i) to allow substantially total reaction of the acidic solution with materials in the production strata thereby increasing the permeability of the production strata and (ii) to assure that the acid is substantially spent before it flows to the well.

* * * * *

UNITED STATES PATENT AND TRADEMARK OFFICE
CERTIFICATE OF CORRECTION

PATENT NO. : 5,168,930

DATED : December 8, 1992

INVENTOR(S) : Ben W. Wiseman; Leroy L. Carney

It is certified that error appears in the above-identified patent and that said Letters Patent is hereby corrected as shown below:

On the title page, item [63]:
Under Related U.S. Application Data after "5,002,128" insert -- which issued March 26, 1991 --;

Col. 13, line 58, after "desirable" delete "t" and in lieu thereof insert -- to --;

Col. 18, line 24, delete "Δ", both occurrences, and in lieu thereof insert -- inches --;

Col. 22, line 2, delete "20" and in lieu thereof insert -- 30 --;

Col. 23, line 9, delete "2" and in lieu thereof insert -- 1 --;

Col. 24, line 13, delete "zones" and in lieu thereof insert -- zone --;

Col. 24, line 32, delete "in" and in lieu thereof insert -- into --;

Col. 24, line 58, delete "20" and in lieu thereof insert -- 30 --;

UNITED STATES PATENT AND TRADEMARK OFFICE
CERTIFICATE OF CORRECTION

PATENT NO. : 5,168,930
DATED : December 8, 1992
INVENTOR(S) : Ben W. Wiseman; Leory L. Carney It is certified that error appears in the above-indentified patent and that said Letters Patent is hereby corrected as shown below:

Col. 26, line 28, delete "eater" and in lieu thereof insert --water--.

Signed and Sealed this

Eleventh Day of January, 1994

Attest:

BRUCE LEHMAN

*Attesting Officer*  *Commissioner of Patents and Trademarks*